US008639543B2

(12) United States Patent
Boss et al.

(10) Patent No.: US 8,639,543 B2
(45) Date of Patent: Jan. 28, 2014

(54) METHODS, SYSTEMS, AND MEDIA TO IMPROVE EMPLOYEE PRODUCTIVITY USING RADIO FREQUENCY IDENTIFICATION

(75) Inventors: Gregory J. Boss, American Fork, UT (US); Rick A. Hamilton, II, Charlottesville, VA (US); Richard H. Le Sesne, Chapel Hill, NC (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1830 days.

(21) Appl. No.: 11/264,599

(22) Filed: Nov. 1, 2005

(65) Prior Publication Data

US 2007/0100677 A1 May 3, 2007

(51) Int. Cl.
*G06Q 10/00* (2012.01)
(52) U.S. Cl.
USPC ....... 705/7.11; 705/28; 340/572.1; 340/572.4
(58) Field of Classification Search
None
See application file for complete search history.

(56) References Cited

U.S. PATENT DOCUMENTS

| | | | |
|---|---|---|---|
| 5,524,077 A * | 6/1996 | Faaland et al. | 705/7.21 |
| 5,634,056 A * | 5/1997 | Casotto | 1/1 |
| 5,884,278 A | 3/1999 | Powell | |
| 6,842,719 B1 | 1/2005 | Fitzpatrick et al. | |
| 6,985,872 B2 * | 1/2006 | Benbassat et al. | 705/7.14 |
| 7,123,149 B2 * | 10/2006 | Nowak et al. | 340/572.1 |
| 7,180,422 B2 * | 2/2007 | Milenkovic et al. | 340/572.4 |
| 7,219,066 B2 * | 5/2007 | Parks et al. | 705/1.1 |
| 7,242,303 B2 * | 7/2007 | Patel et al. | 340/572.4 |
| 7,295,114 B1 * | 11/2007 | Drzaic et al. | 340/572.1 |
| 7,437,309 B2 * | 10/2008 | Magrino et al. | 705/7.14 |
| 7,454,417 B2 * | 11/2008 | Tong et al. | 1/1 |
| 7,475,806 B1 * | 1/2009 | Crossno et al. | 235/375 |
| 7,477,154 B2 * | 1/2009 | Braunstein | 340/573.1 |
| 7,573,373 B2 * | 8/2009 | Nguyen | 340/426.12 |

(Continued)

FOREIGN PATENT DOCUMENTS

CN      1554957 A     12/2004

OTHER PUBLICATIONS

Loyalty trends for the 21st century Mike Capizzi, Rick Ferguson, Richard Cuthbertson. Journal of Targeting, Measurement and Analysis for Marketing. London: Mar. 2004. vol. 12, Iss. 3; p. 199, 14 pgs.*

(Continued)

*Primary Examiner* — Gurkanwaljit Singh
(74) *Attorney, Agent, or Firm* — John R. Pivnichny; Law Office of Jim Boice (57) ABSTRACT

Methods, systems, and media to improve employee productivity using radio frequency identification (RFID) are disclosed. Embodiments comprise a method of transmitting information from RFID tags, receiving the information in an RFID tag reader, analyzing the information to select a number of employees to work in a work area, and dispatching one or more employees to or from the work area according to the selected number of employees. Some embodiments select employees with certain skills, based on the RFID tag information. In other embodiments, an RFID tag reader monitors the movement of employees to ensure that they are moving according to the dispatch and potentially dispatching alternate employees. Some embodiments involve reading information from RFID tags attached to goods, whereas other embodiments involve reading information from RFID tags in cards carried by employees and customers, and RFID tags fastened to shopping carts and shopping baskets.

20 Claims, 4 Drawing Sheets

(56) References Cited

U.S. PATENT DOCUMENTS

| | | | |
|---|---|---|---|
| 2001/0042001 A1* | 11/2001 | Goto et al. | 705/9 |
| 2002/0038267 A1* | 3/2002 | Can et al. | 705/28 |
| 2002/0040313 A1* | 4/2002 | Hunter et al. | 705/9 |
| 2002/0042751 A1* | 4/2002 | Sarno | 705/26 |
| 2002/0055870 A1* | 5/2002 | Thomas | 705/10 |
| 2002/0095300 A1* | 7/2002 | Parks et al. | 705/1 |
| 2002/0103688 A1* | 8/2002 | Schneider | 705/8 |
| 2002/0169714 A1* | 11/2002 | Ike et al. | 705/39 |
| 2002/0198766 A1* | 12/2002 | Magrino et al. | 705/11 |
| 2003/0033184 A1* | 2/2003 | Benbassat et al. | 705/8 |
| 2003/0156028 A1* | 8/2003 | Menard et al. | 340/539.1 |
| 2004/0068427 A1* | 4/2004 | Su | 705/9 |
| 2004/0153472 A1* | 8/2004 | Rieffanaugh, Jr. | 707/104.1 |
| 2004/0174261 A1* | 9/2004 | Volpi et al. | 340/572.1 |
| 2004/0181461 A1* | 9/2004 | Raiyani et al. | 705/26 |
| 2004/0181467 A1* | 9/2004 | Raiyani et al. | 705/28 |
| 2004/0210474 A1 | 10/2004 | Hart et al. | |
| 2004/0217864 A1* | 11/2004 | Nowak et al. | 340/572.1 |
| 2005/0029052 A1 | 2/2005 | Nguyen | |
| 2005/0088320 A1* | 4/2005 | Kovach | 340/933 |
| 2005/0177380 A1* | 8/2005 | Pritchard et al. | 705/1 |
| 2006/0055508 A1* | 3/2006 | Kumar et al. | 340/5.2 |
| 2006/0066148 A1* | 3/2006 | Nguyen | 307/10.2 |
| 2006/0208888 A1* | 9/2006 | Patel et al. | 340/572.1 |

OTHER PUBLICATIONS

Loyalty trends for the 21st century Mike Capizzi; Rick Ferguson; Richard Cuthbertson Journal of Targeting, Measurement and Analysis for Marketing; Mar. 2004; 12, 3; ABI/INFORM Global p. 199.*

Capture the action Michel, Roberto. Manufacturing Systems. Wheaton: Jan. 1997. vol. 15, Iss. 1; p. 28, 5 pgs.*

RFID: Poised to be the next advance in Inv. Mgmt. technology Anonymous Inventory Management Report; Nov. 2003; 2003, 11; ProQuest Central p. 2.*

Business: The best thing since the barcode; The IT revolution The Economist. London: Feb. 8, 2003. vol. 366, Iss. 8310; p. 72.*

Tiny trackers: use of RFID by libraries and booksellers James Lichtenberg; Douglas Carp; Donald Leslie; Karen Saunders; Lee Tien Newsletter on Intellectual Freedom; Sep. 2004; 53, 5; Research Library p. 169.*

* cited by examiner

METHODS, SYSTEMS, AND MEDIA TO IMPROVE EMPLOYEE PRODUCTIVITY USING RADIO FREQUENCY IDENTIFICATION

FIELD

The present invention relates to radio frequency identification systems. More particularly, the present invention relates to using radio frequency identification systems to improve employee productivity in businesses, including businesses that have points of sale, warehouse employees, and customer service centers.

BACKGROUND

In many businesses today, managers struggle to minimize employee labor costs. In deciding how many employees are necessary for daily business operations, managers constantly balance competing and conflicting business needs. Take, for example, a manager of a retail store. The manager may want to minimize the number of point of sale (POS) cashiers. Obviously, employing fewer POS cashiers results in reduced labor costs. However, managers risk aggravating or irritating customers when checkout lines and checkout times become too long due to a shortage of POS cashiers. Irritated customers may not return, resulting in lower business revenues. Conversely, if a manager uses too many POS cashiers, labor costs accrue unnecessarily when relatively few customers check out and some cashiers remain idle.

Another example of conflicting business needs that challenge managers involves staffing warehouse, or storage area, employees. Managers must select a minimum number of workers to unload product shipments from freight carriers, such as freight trucks. Similar to the POS cashier dilemma, the manager must strike a balance between the number of warehouse workers and the arrival of product shipments. If the manager employs too few warehouse workers, freight trucks may wait unnecessarily long periods of time resulting in increased freight charges. Alternatively, employing too many warehouse workers drives up labor costs when no product shipments are being unloaded and the warehouse workers sit idle. Choosing an optimal number of POS cashiers and selecting an optimal number of warehouse workers are only two examples of the challenges that managers face in minimizing employee labor costs. Similar challenges are readily found in all types of businesses.

Managers often avoid problems of understaffing by erring on the side of caution and employing a potentially excessive number of employees. Utilizing an excessive number of employees may work relatively well but this method has a major drawback, that drawback being unnecessarily high business operating costs.

As an alternative to overstaffing, managers may strive to minimize labor costs by diligently comparing real-time employee workloads with corresponding real-time workload requirements and making employee staffing decisions accordingly. For example, a store manager may notice that the lengths of POS lines for store customers waiting to make their final purchases have become unacceptably long due to an insufficient number of POS cashiers. The store manager may respond by summoning other store employees, via a store pager or some other means, to come to the POS lines and serve as cashiers. Conversely, the store manager may notice that several cashiers are sitting idle, due to too few store customers checking out. The manager may respond by deploying idle cashiers to other areas of the store where the workload is greater. This method of continually adjusting the number of employees at POS stations is merely one example. In a similar example, managers may monitor warehouse activities and summon more employees to either load or unload products to or from freight carriers, depending on product shipping demands.

Dispatching POS and warehouse employees in this manner has several drawbacks. First, the effectiveness of this method depends on the effectiveness of the manager. If the manager is inefficient, this solution will also be inefficient. Second, this method requires constant manager attention. If the manager needs to attend to other business matters, the POS lines may grow unnoticed and irritate customers. Similarly, if the manager attends to other matters, the store environment may change which will cause POS lines to grow unnoticed and irritate customers by increasing their wait time for length of service. Third, this method stifles businesses wanting to decrease managerial labor costs. Similar to minimizing the number of lower skilled store employees, business owners prefer to minimize the labor costs of managers as well and staff only the minimal number of managers necessary to effectively operate the business. Unfortunately, this method generally requires increasing the number of managers, not decreasing it.

As another alternative solution, some businesses use POS transaction data and warehouse transaction data to analyze historical business needs. Using this historical transaction data, collected from such sources as item universal product code (UPC) data on products sold or received, a manager may statically analyze and predict labor requirements for a business. The manager may make staffing decisions based on these analyses. Similar to the other methods, current utilization of item UPC data requires continual or periodic manager involvement for dispatching employees to avoid labor shortfalls, such as would be the case when several checkout lines become very long despite staffing according to the analyses.

Although using historical data for predicting labor requirements has decreased labor costs and improved profits, this method also has many drawbacks. Again, the effectiveness of this solution depends on the experience and effectiveness of the manager analyzing the data and making the staffing decisions. Additionally, past data do not always accurately predict future employee labor requirement trends. One example where past data do not accurately predict future trends would be for a business that is growing. Past sales for a growing business may inadequately predict future labor requirements, with booming sales and increased warehouse shipments. Additionally, this solution is static, dependent on past data, and may not adequately address sudden dynamic increases in customer purchases or warehouse shipments.

What is needed, therefore, is a way to dynamically, efficiently, and automatically dispatch employees to locations of increased business activities. Locating, dispatching, and redeploying employees in a dynamic manner can result in higher worker productivity, improved shopping experience for customers resulting in greater customer satisfaction, and potentially lower labor costs.

SUMMARY

The problems identified above are in large part addressed by methods, systems, and media to improve employee productivity and decrease employee labor costs in businesses by using radio frequency identification (RFID) systems. One embodiment comprises a method to improve employee productivity by using RFID tag readers to count the number of goods introduced to areas near POS stations and dispatching employees to and from the POS stations based on a continuously or statically calculated average customer checkout time. The method generally involves transmitting information from RFID tags attached to the goods, receiving the information in an RFID tag reader, analyzing the information to select a number of employees to work at the POS stations, and dispatching one or more employees to or from the POS stations according to the selected number of employees.

Another embodiment comprises a system for improving employee productivity and decreasing labor costs by using RFID systems. The system may comprise one or more RFID receivers that receive signals transmitted from one or more RFID transmitters. The signals contain information stored in RFID tags that may be attached to goods, and employee or customer cards. A computing module of the system determines a number of employees that should be employed to work in a certain work area of a business, using the information transmitted from the RFID tags as well as other factors, such as employee location, employee skills, and expected processing or handling time for the goods. The system then dispatches employees to and from the work area, depending on the calculated labor requirements for the area. Alternative embodiments of the system include a number of RFID tag readers that monitor the movement of dispatched employees and dispatch alternate employees if the employees do not respond according to the dispatches.

A further embodiment comprises a machine-accessible medium containing instructions for a machine to improve employee productivity in a business. The machine-accessible medium may comprise instructions for receiving information from RFID tag readers, analyzing the information, then selecting and dispatching a number of employees to work in a certain work area based on the analyzed information. The machine-accessible medium instructions may also provide for the monitoring of dispatched employees and the selecting and dispatching of alternate employees.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to improve or optimize employee labor productivity and reduce employee labor costs using radio frequency identification (RFID) are disclosed. Methods of reading information from RFID tags, analyzing the information from RFID tags, determining efficient arrangements of employees based on the analyses, and dispatching employees according to the determined efficient arrangements are discussed. Embodiments comprise retail outlets or stores utilizing one or more RFID systems to read information from a number of RFID tags to dispatch store employees to store areas requiring employee labor. In some embodiments, idle employees or employees engaged in lower priority activities in various store shopping areas may be dispatched to store checkout stations, or point of sale (POS) stations.

In other embodiments, RFID computer systems with software and hardware may utilize RFID tag information attached to palletized goods in a cargo truck and dispatch idle employees to help unload the goods in a storage area. In further embodiments, RFID computer systems may monitor the number of customers in a customer service line and dispatch idle store employees both to and from the customer service center.

In some embodiments, a computerized RFID system may read RFID tag information attached to goods being purchased at POS stations to determine efficient employee location arrangements. In alternative embodiments, computerized RFID systems may read RFID tag information attached to the handles of shopping carts and customer frequent shopper cards to help determine efficient employee arrangements. In yet further embodiments, RFID systems may monitor locations of store employees having employee security badges, using a grid of RFID tag readers, to help determine which employees should be dispatched to POS stations.

In other embodiments, RFID systems may query one or more databases of historical information in determining an efficient employee arrangement. The databases may contain information that may affect the checkout time of a customer, such as item size, weight, or cost. In these embodiments, the RFID system may include the additional checkout time information when determining an efficient number of POS employees. In alternative embodiments, the databases may contain such information as the preferred customer payment methods for customers currently in the POS checkout line, which may also be considered by the RFID system in determining an efficient number of POS employees.

While portions of the following detailed discussion describe many embodiments employing RFID methods, systems, and media for improving employee productivity, upon review of the teachings herein, a person of ordinary skill in the art will recognize that the following invention may be practiced in a variety of ways, such as by a complete hardware system or by using software in various system computers. Further, while embodiments discuss dispatching retail store and warehouse employees based on RFID tag information, one of ordinary skill in the art will recognize that other businesses desiring efficient employee staffing may also employ these methods, systems, and media in similar business settings to perform substantially equivalent functions.

Unlike UPC technologies, radio frequency identification (RFID) technologies may offer promise in helping managers efficiently manage employee labor. Generally, the use of UPC technology requires the exposed barcode of an item to be passed within visual range of a UPC laser scanner. Comparatively, an electronic system may scan an item employing an RFID technology merely by introducing the item within the vicinity or measuring range of the electronic system. Additionally, while UPC items may generally only be scanned one at a time, an electronic system may scan hundreds of RFID items virtually simultaneously, without the need for optical or line-of-sight contact. To better understand how RFID data may be captured and analyzed, and how such data may be used to help managers, one needs to understand how this technology works.

RFID technology uses wireless radio waves to identify objects. In one of its most simple forms an RFID system may comprise two components, an RFID tag and an RFID reader.

RFID Tags

RFID tags, alternatively referred to as RFID cards or RFID transponders, exist in may shapes and sizes. Generally, they contain one or more coils to serve as an antenna, and a radio transceiver contained on a silicon microchip. This microchip may also store information, such as a unique identification number for identifying the object to which the tag is attached. Some RFID tags may allow a reader to update or change the information stored in the tag. Additionally, RFID tags may be classified as passive or active. Passive tags generally do not broadcast any information stored within the tag until activated by an RFID reader. Active tags, on the other hand, may constantly broadcast identification or information stored on the microchip. These active tags usually contain batteries. The batteries may provide additional power for transmitting from the transceiver and operating the microchip. The batteries generally allow the tags to send their data greater distances than passive tags.

RFID Readers

RFID readers may have the same basic components as RFID tags, including an antenna and reader electronics. The reader generally performs several functions. In some systems, a reader may produce a low-level radio frequency (RF) magnetic fields generated by the reader antennas. This magnetic field may broadcast activation codes, which may trigger RFID tags in the vicinity of the reader and cause them to spring into action. This magnetic field may also provide the actual operating power for passive RFID tags. When a passive RFID tag is carried within range of the magnetic field generated by the reader, the antenna in the tag may collect the field energy from the magnetic field and use it to power the tag microchip. Passive tags may then use this captured field energy to transmit information stored on the microchip, such as the identification information. The reader receives the information transmitted from the tag, whereupon the reader may store it or transmit it to another device, such as a central computer, for processing. One example would be capturing the item number of a product selected by a consumer and placed in the basket of a shopping cart, using the transmitted data to determine the current price of the item from a store cost database, and adding it to a customer basket checkout total.

Figure 1:
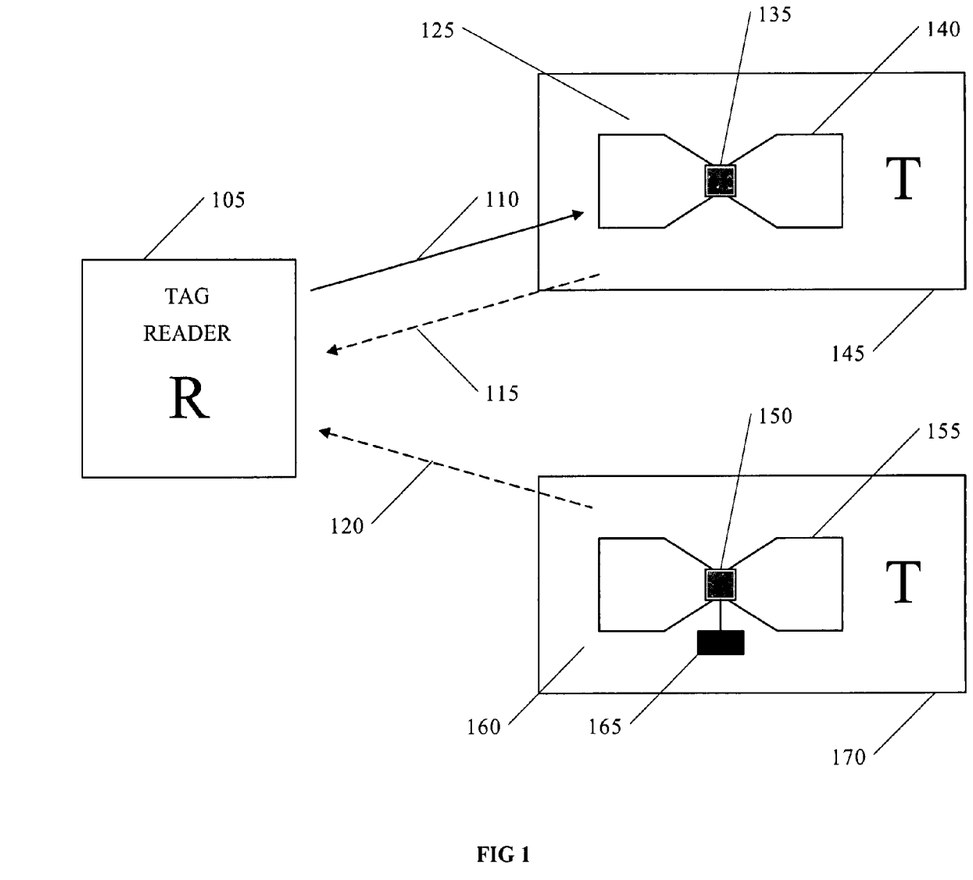
FIG. 1 depicts an RFID apparatus, including an RFID reader, a passive RFID tag, and an active RFID tag.

Turning now to the drawings, FIG. 1 depicts an RFID apparatus 100 which may be employed in various embodiments for efficiently managing employee labor. RFID apparatus 100 comprises an RFID tag reader 105 which may be used to communicate with a passive RFID tag 125. In alternative embodiments, RFID tag reader 105 may be used to communicate with an active RFID tag 160.

When communicating with the passive RFID tag 125, RFID tag reader 105 may transmit a tag reader transmission signal 110 to activate the passive RFID tag 125. Upon receiving the tag reader transmission signal 110 via a passive tag antenna 140, the passive tag antenna 140 may transfer the tag reader transmission signal 110 to a passive tag integrated circuit 135. The passive tag integrated circuit 135 may utilize the tag reader transmission signal 110 for operational power and in turn transmit information back to RFID tag reader 105 via a passive tag transmission signal 115.

The passive RFID tag 125, comprised of the passive tag antenna 140 and the passive tag integrated circuit 135, may be attached to a passive tag surface 145. In many embodiments, the passive tag surface 145 may be a paper label attached to a consumer good. In other embodiments, the passive tag surface 145 may be cloth label attached to a consumer good, such as a shirt or pair of jeans. In alternative embodiments, the passive tag surface 145 may be an identification card, such as an employee security badge or a customer frequent shopper card. In further embodiments, the passive tag surface 145 may be a label attached to a pallet of consumer goods or mechanical equipment such as aircraft engine parts.

As stated, RFID apparatus 100 may comprise RFID tag reader 105, used to communicate with active RFID tag 160. RFID tag reader 105 may receive information from active RFID tag 160 via an active tag transmission signal 120. Active tag transmission signal 120 may transmit information, such as an item description or serial number, stored in an active tag integrated circuit 150 and transmitted via an active tag antenna 155. Active RFID tag 160 may also contain a battery 165. The battery 165 may provide power to the active tag integrated circuit 150, as well as increase the signal strength of active tag transmission signal 120. Increasing the signal strength of active tag transmission signal 120 may allow RFID tag reader 105 to receive active tag transmission signal 120 at greater separation distances than the passive tag transmission signal 115, generated by the passive RFID tag 125.

Similar to the passive tag surface 145, active RFID tag 160 may reside on an active tag surface 170. In some embodiments, the active tag surface 170 may be a paper, plastic, or cloth label attached to a consumer good. In other embodiments, the active tag surface 170 may be located in an employee identification badge, or an employee personal organizer device, such as an employee personal digital assistant (PDA). In even further embodiments, active RFID tag 160 and the active tag surface 170 may be located in a customer shopping cart, e.g. in the handle of the cart. In even further embodiments active RFID tag 160 may also receive information from RFID tag readers and have the information stored in the tag modified by such readers.

Different embodiments will contain varying numbers of RFID tag reader 105. For example some embodiments may contain only one or two of RFID tag reader 105. Other embodiments, however, may employ a hundred or more of RFID tag reader 105 arranged in a type of RFID tag reader grid. An RFID tag reader grid may comprise a variety of arrangements of RFID tags. One RFID tag reader grid may comprise an orderly arrangement of individual RFID tag readers located equidistant from adjacent RFID tag readers. Alternatively, one RFID tag reader grid may comprise a number individual RFID tag readers spaced in varying distances from each other and may even comprise several clusters of tag readers. Regardless of the grid arrangement, the tag reader grid may monitor RFID tags on store employees and track their location while in the business area. In further embodiments, RFID tag location tracking may be enhanced by using triangulation of the strength of the returned signal, such as active tag transmission signal 115, from a number of RFID tag reader 105.

In some embodiments, RFID tag reader 105 may only be able to communicate with passive tags, similar to the passive RFID tag 125. In other embodiments, RFID tag reader 105 may only be able to communicate with active tags, such as active RFID tag 160. However, in some embodiments, RFID tag reader 105 may be a multi-format tag reader, capable of communicating with various models or types of both passive and active tags. Other embodiments may employ any combination or mix of single format and multi-format tag readers, for communicating with both active and passive tags. In some embodiments, restrictions and isolation of RFID tags from readers may be accomplished via different signal characteristics, such as frequency, or from analysis of the store RFID tag information.

The types of information stored in the passive tag integrated circuit 135 and the active tag integrated circuit 150 may vary greatly. For example, a tag integrated circuit may be attached to a consumer good and only contain simple information such as a serial number for the consumer good. Alternatively, though, the tag integrated circuit may contain such information as the date the consumer good was manufactured, physical dimensions and weight of the consumer good, or the type or classification of the good.

Likewise, information stored in the tag integrated circuit may be employee or customer related. In some embodiments, the tag integrated circuits may contain employee identification and any specific information, such as the employee training history, acquired skills, average customer checkout speed, or the different languages that the employee may be able to speak. Alternatively, in some embodiments the tag integrated circuits may contain unique customer information, such as the customer name, address, telephone number, preferred payment method, bank account information, and even such information as historical average checkout time.

With varying types and amounts of information being stored on various passive and active tags, similar to the passive tag integrated circuit 135 and the active tag integrated circuit 150, RFID tag reader 105 may read all the information from the tags, or RFID tag reader 105 may only read portions of the information. For example, some embodiments may have RFID tag reader 105 only receive product identification information, while in other embodiments RFID tag reader 105 may receive weight and dimension information along with the product identification information.

In addition to varying amounts of information being read from various tags in different embodiments, some embodiments may employ an RFID tag reader 105 capable of not only reading information but capable of writing information to RFID tags as well. For example, after activating the passive RFID tag 125 via the tag reader transmission signal 110 and receiving information via the passive tag transmission signal 115, RFID tag reader 105 may send information back to the passive RFID tag 125 using the tag reader transmission signal 110 which may be stored in memory of the passive tag integrated circuit 135.

One example of an embodiment where information is written to the passive RFID tag 125 may be when an employee has worked more than two consecutive hours at a POS station. RFID tag reader 105 may write such shift work information to the passive RFID tag 125. Consequently, the employee shift work information may be subsequently read by a different RFID tag reader 105 and be a contributing factor for whether or not the employee is selected for another immediate work task, such as loading a cargo truck at a storage area.

Similar to writing information to the passive RFID tag 125, RFID tag reader 105 may also write information to active RFID tag 160. In writing information to active RFID tag 160, such embodiments may employ a tag reader transmission signal similar to the tag reader transmission signal 110.

Figure 2:
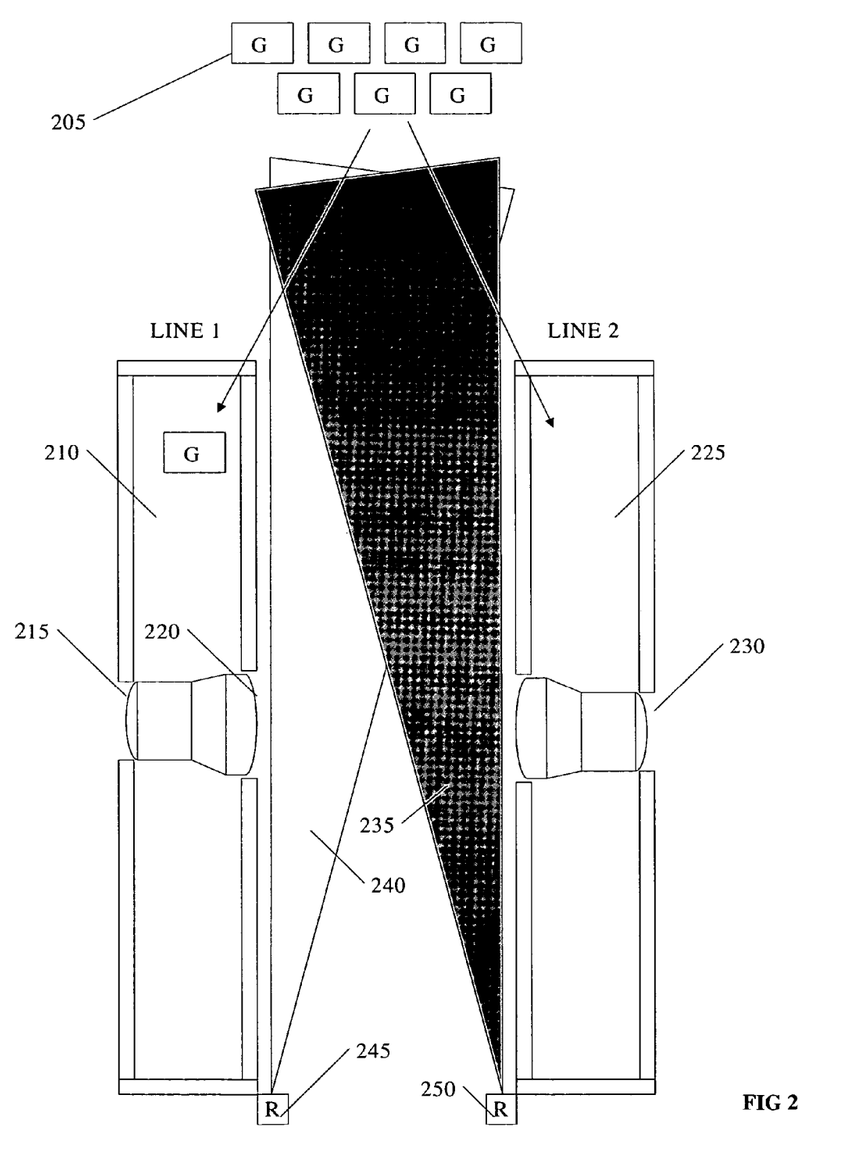
FIG. 2 depicts an example plan view of multiple POS stations employing at least one RFID apparatus, with a set of goods being introduced into one POS station area.

Turning now to FIG. 2, we see a plan view of a point of sale (POS) station employing an RFID system 200. In this particular embodiment, there are two customer checkout lines, with two consumer goods conveyor belt assemblies, line 1 conveyor belt assembly 210 and line 2 conveyor belt assembly 225. Atop the line 1 conveyor belt assembly 210 and the line 2 conveyor belt assembly 225 sit two POS display screens, line 1 POS display screen 220 and line 2 POS display screen 230, respectively.

The POS station employing an RFID system 200 shown in FIG. 2 has two RFID tag readers at the end of the station walkway, first tag reader 245 and second tag reader 250. First tag reader 245 transmits and receives RFID tag information in a first transceiving field 240. Similarly, second tag reader 250 transmits and receives RFID tag information in a second transceiving field 235. Whenever a number of goods 205, containing RFID tags, is carried into the first transceiving field 240 and the second transceiving field 235, first tag reader 245 and second tag reader 250 receive information about the goods 205 from attached RFID tags.

First tag reader 245 and second tag reader 250 may receive RFID tag information from tags on the goods 205 and communicate the information directly to a line 1 POS computing module 215. The line 1 POS computing module 215 may then perform some calculation based upon the RFID tag information and display results of the calculation on the line 1 POS display screen 220. For example, as customers enter the line, the POS station employing an RFID system 200 may retrieve tag information from the goods 205 and use that tag information to calculate and display a total number of items on the line 1 POS display screen 220.

After first tag reader 245 and second tag reader 250 communicate the tag information from the goods 205 to the line 1 POS computing module 215, the line 1 POS computing module 215 may use such tag information to estimate the amount of time remaining for queue completion. Such estimate of time remaining may be displayed on the line 1 POS display screen 220 and may also be utilized to determine whether more POS station cashiers should be summoned to vacant POS stations. In alternative embodiments, after first tag reader 245 and second tag reader 250 communicate the tag information from the goods 205 to the line 1 POS computing module 215, the line 1 POS computing module 215 may then query a database containing the average checkout times for each of the items individually, sum such times, and use the sum to estimate the amount of time remaining for queue completion.

In addition to reading RFID tag information from tags on the goods 205, first tag reader 245 and second tag reader 250 may also read RFID tag information from RFID tags attached to customer shopping carts, customer shopping baskets, customer identification cards, or customer frequent shopper cards. Such information may also be communicated directly to the line 1 POS computing module 215. Such RFID tag information may be used to help determine an accurate count of customers waiting in line. The number of customers waiting in line may be one additional factor that the line 1 POS computing module 215 uses to estimate the amount of time remaining for queue completion. For example, the line 1 POS computing module 215 may calculate the time remaining for queue completion by simply multiplying the number of remaining customers by a weighted average means of cash, credit, debit, and check transaction checkout times.

Additionally, customer identification cards and frequent shopper cards may contain additional customer information that may affect remaining checkout time at the POS station employing an RFID system 200. For example, customer frequent shopper cards may contain information related to the preferred method of payment for customers, such as whether the customers prefer to pay using cash, checks, or credit cards. First tag reader 245 and second tag reader 250 may receive this preferred customer payment information from and transmit the information to the line 1 POS computing module 215, which may use such information as an additional factor in estimating the amount of time remaining for queue completion. For example, the line 1 POS computing module 215 may compute the remaining time for queue completion by multiplying the number of customers in line using each payment method by average payment processing times for each method, and summing all such products together.

Instead of transmitting RFID tag information received from tags on the goods 205 by first tag reader 245 and second tag reader 250 directly to the line 1 POS computing module 215 and the line 1 POS display screen 220, alternative embodiments may instead communicate RFID tag information to a remote central computer. The remote central computer may be located in the store, as in a central office or computer room, or the computer may be located at a remote location, such as a central computing site or other store. In the case where the computer is located at a remote location, the POS station employing an RFID system 200 depicted in FIG. 2 may transmit the RFID tag information over a private local network, through a satellite uplink-downlink network, or even over the Internet.

In some embodiments, the remote central computer may receive the estimated checkout times remaining for queue completion from each POS station in stores having multiple systems similar to the POS station employing an RFID system 200. Such remote central computer may use the combined information transmitted from all of the POS stations to calculate an average checkout time for customers waiting in line. Whenever the calculated average checkout time for previous customers increases above a goal number, such as 3 minutes, the remote central computer may summon another employee to serve as a cashier in a vacant POS station.

In some embodiments, the remote central computer may summon employees via an employee pager. Alternatively, the remote central computer may request the employee to serve as a cashier using a computerized announcement over a store public address system. While the POS station employing an RFID system 200 depicted in FIG. 2 utilizes two RFID tag readers, namely first tag reader 245 and second tag reader 250, alternative embodiments may employ one or more RFID tag readers. For example, one embodiment may employ only one RFID tag reader at a point in close proximity to the line 1 POS display screen 220. Other embodiments may employ five RFID tag readers, two RFID tag readers at the entry point of the station walkway, first tag reader 245 and second tag reader 250 at the end point of the station walkway, and one RFID tag reader at a point near the line 1 POS display screen 220. One may desire to employ such tag readers in this arrangement to increase tag reading accuracy and decrease the impact of RFID tag collisions or other such problems.

In further embodiments, the two customer conveyor belt assemblies may not face each other, as do the line 1 conveyor belt assembly 210 and the line 2 conveyor belt assembly 225, as shown in FIG. 2. Instead, the line 2 conveyor belt assembly 225 may face the right, similar to how the line 1 conveyor belt assembly does in FIG. 2. Additionally, in other embodiments, each conveyor belt assembly may comprise UPC scanner assemblies and UPC scanner screens in addition to, or in place of, the POS display screens, such as the line 1 POS display screen 220 and the line 2 POS display screen 230. For example, UPC scanner equipment may be present at the POS stations when the POS stations previously existed but were retrofitted with new RFID tag reading equipment.

Figure 3:
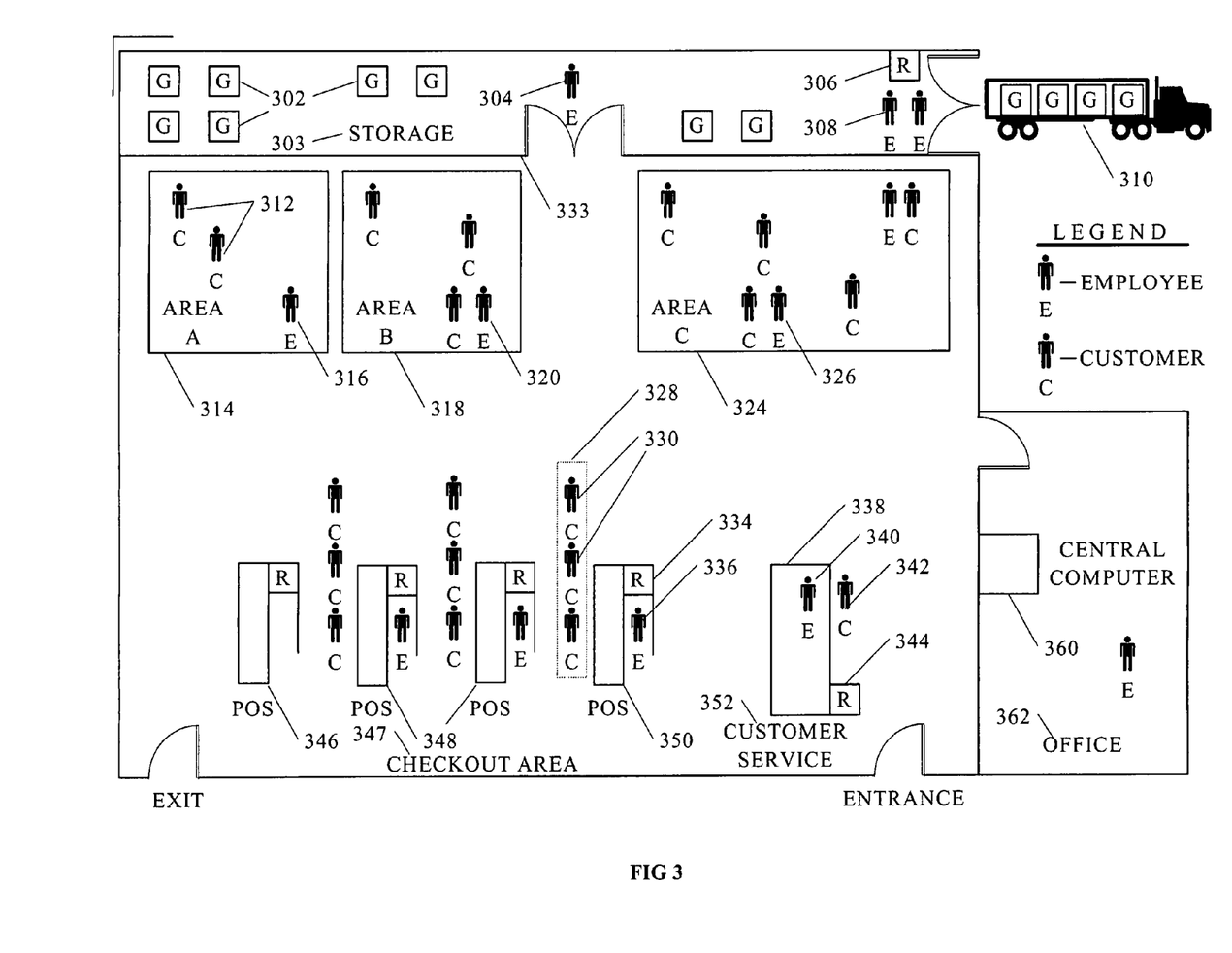
FIG. 3 shows an example store employing a storewide RFID system, with a checkout area, a customer service center, shopping areas, an office, and a storage area.

To further illustrate the concept of using RFID systems to improve employee productivity and reduce labor costs in businesses, we turn now to FIG. 3. FIG. 3 shows a retail store 300 having many different store areas that are typically found in many retail and wholesale stores, such as a storage area 303, shopping area "A" 314, shopping area "B" 318, shopping area "C" 324, an office area 362, a checkout area 347, and a customer service area 352. As with most retail stores, retail store 300 has a number of employees working, such as a storage area employee 304, a shopping area "B" employee 320, and POS station 350 cashier employee 336. Retail store 300 also depicts several customers shopping and checking out, such as area "A" customers 312, and several customers waiting to check out 330.

Also similar to other retail and wholesale stores, retail store 300 has other POS stations besides POS station 350, namely POS stations 348 with customers and a vacant POS station 346 with no customers. Several customers waiting to check out 330 may form a line 328 next to POS station 350. As several customers waiting to check out 330 approach POS station 350, each customer may bring his or her goods and attached RFID tags within scanning or reading range of RFID reader 334. RFID reader 334 may scan RFID tags of customers in line 328, including the attached RFID tags on goods, tags in shopping basket handles, and RFID tags embedded within customer frequent shopper cards. RFID reader 334 may also scan an RFID tag that may be attached to an employee identification badge for cashier employee 336. Similarly, RFID readers for other POS stations 348 may operate similar to RFID reader 334.

RFID reader 334 for POS station 350 may operate similar to RFID tag reader 105 depicted in FIG. 1 and described in the accompanying description. Additionally, the RFID tags on goods, shopping baskets handles, customer frequent shopper cards, and employee identification badges may be similar to the passive RFID tag 125 and the active RFID tag 160 shown in FIG. 1. Again, the RFID readers for POS stations 348 and vacant POS station 346 may operate the same way.

After scanning RFID tags of customers and POS employees, RFID reader 334 for POS station 350 and the RFID readers for POS stations 348 may transmit the information scanned to a central computer 360. The RFID tags scanned may contain such information as the number and type of goods in line to be purchased, the number of customers waiting to check out, and historical payment methods of customers. Central computer 360 may then use the information transmitted from RFID reader 334 for POS station 350 and the RFID readers for POS stations 348 to estimate the amount of time remaining for completing the purchases. Central computer 360 may calculate this amount of time remaining in a variety of ways in different embodiments. Additionally, central computer 360 may use this amount of time remaining to predict average checkout times for the customers in the checkout lines.

Calculating The Total Checkout Time Remaining

Using data transmitted from RFID reader 334, a computing module, such as central computer 360, may continually note the time that elapses between when a customer enters line 328 and when the customer completes his or her purchase. Tracking the checkout time for POS station 350 and POS stations 348 in this manner may allow the computing module, or central computer 360, to compute an average or other mathematically relevant checkout time characteristic across one or more POS stations. The computing module may also multiply the average checkout time by the number of customers remaining in order to estimate the time remaining for completing all of the purchases.

In an alternative embodiment, central computer 360 may calculate the time remaining for completing all of the purchases in a different manner. For example, central computer 360 may dynamically generate a database containing the average time that POS station 350 cashier employee 336 takes to process standardized goods, or items, such as items that are relatively small and easily handled. Likewise, central computer 360 may dynamically calculate the average time for processing nonstandard items, which may be large, heavy or bulky items that take longer to process than most other items. Central computer 360 may then multiply these average times for processing standard and nonstandard items by the numbers of standard and nonstandard items in line 328 to calculate the time remaining for completing the purchases of the items in line 328. Central computer 360 may perform similar calculations for POS stations 348 to calculate the time remaining for completing all of the purchases in the lines of POS stations 348.

In another alternative embodiment, central computer 360 may further refine the method of calculating the amount of time remaining for completing the purchases by factoring in the method in which customers pay for their goods. For example, RFID reader 334 may scan RFID tags embedded within customer frequent shopper cards in line 328. The preferred methods of payments for individual customers, whether they are cash, credit, debit, or check, may be included in the information of the RFID tags. RFID reader 334 may transmit these preferred methods of payment information to central computer 360. Central computer 360 may adjust the estimated time remaining accordingly. For example, average credit card transactions may take 30 seconds while average check transactions may take 70 seconds. If line 328 is full of customers who prefer paying by check, central computer 360 may add a quantity of time to the estimated time remaining that was calculated without this additional data.

Upon calculating the total time remaining for completing the purchases and the corresponding average checkout time for customers in the POS lines, central computer 360 may summon one or more available employees to come to the checkout area 347 and serve as a cashier at a vacant POS station, such as vacant POS station 346. For example, if central computer 360 predicts that the average checkout time for customers in POS line 350 and POS lines 348 is five minutes, but the store manager has selected a maximum desired checkout time of 3 minutes, then central computer 360 may summon an available employee to come and serve as a cashier at vacant POS station 346.

Dispatching Employees to Vacant POS Stations

Similar to the variety of ways that central computer 360 may calculate the total time remaining and the corresponding average checkout time for customers, a dispatching module, which may be central computer 360 working in conjunction with an automated public address system, may select and dispatch employees to vacant POS stations in a variety of ways. For example, central computer 360 may simply select employee 316 from shopping area "A" 314 because employee 316 is the closest employee to vacant POS station 346. Alternatively, central computer 360 may select employee 326 from shopping area "C" 324, even though employee 326 may be assisting a customer farther away from vacant POS station 346 than employee 316. Central computer 360 may select employee 326 over employee 316 for a variety of reasons, such as training, average customer checkout speed, seniority, estimated time before break or employee rest period, or the amount of time before the end of an employee shift.

To illustrate, assume that central computer 360 selects employee 316 to serve as a cashier at vacant POS station 346. Central computer 360 may initiate a dispatch of employee 316 to vacant POS station 346 in a variety of ways. For example, central computer 360 may simply initiate an announcement over a public address system in retail store 300, ordering employee 316 to assist in the checkout area 347. Alternatively, central computer 360, or the dispatching module, may activate a pager on employee 316 with a message code effectively dispatching employee 316 to vacant POS station 346. In even further embodiments, the dispatching module may broadcast a wireless dispatch command to a PDA that employee 316 is carrying. In even further embodiments, the employee skills information may be matched against the known position of other employees of different skills within the store to select the most optimum person to perform the required POS sales function.

Once employee 316 is selected to serve as a cashier at vacant POS station 346 and is dispatched accordingly, a tracking module will continue to monitor employee 316 to ensure that employee 316 arrives at vacant POS station 346 in a timely fashion. In one embodiment, the tracking module may comprise computer system 360 monitoring vacant POS station 346 for the signing in of employee 316. If employee 316 does not sign in, or log on, to vacant POS station 346 within a designated time, central computer 360 may then select another employee, such as idle storage area employee 304, to serve as a cashier. After selecting storage area employee 304, central computer 360 may dispatch him or her to vacant POS 346. Again, central computer 360 may monitor vacant POS station 346 to ensure that storage area employee 304 logs on to vacant POS station 346 within the requisite time. If storage area employee 304 also fails to log on to vacant POS station 346, central computer 360 may then select another employee to serve as a cashier. This process of selecting alternate employees may continue until an employee logs on to vacant POS station 346.

In alternative embodiments, the tracking module may monitor whether storage area employee 304 affirmatively responds to the dispatch command by tracking storage area employee 304 movement. For example, the tracking module may comprise central computer 360 working in conjunction with a grid of tag readers position in business. For example, the grid or network of RFID tag readers may be strategically placed throughout retail store 300 to track the location and movement of storage area employee 304, which may be carrying an RFID tag in an employee identification badge. If the tracking module, which may be central computer 360 monitoring the information transmitted from the grid of RFID tag readers, detects no movement of storage area employee 304, then central computer 360 may select an alternate employee to serve as a cashier. This alternate employee monitoring method may become clearer when described by a more detailed example.

As a further illustration, assume that central computer 360 selects idle storage area employee 304 to serve as a cashier at vacant POS station 346. After dispatching storage area employee 304 to vacant POS station 346, central computer 360 may continue to monitor RFID tag readers located between storage area employee 304 and vacant POS station 346. For example, after paging storage area employee 304, central computer 360 may monitor information transmitted from the RFID tag readers in storage area 303, shopping area "B" 318, and shopping area "C" 324. If, after paging storage area employee 304, RFID tag readers in storage area 303 cease transmitting information from the RFID tag in the identification badge of storage area employee 304 and RFID tag readers in shopping area "B" 318, and shopping area "C" 324 start transmitting such RFID tag information from the badge, then central computer 360 may delay dispatching an alternate employee to vacant POS station 346.

Aside from detecting shortages of employee labor and dispatching employees to remedy the shortages, RFID systems may also detect excessive numbers of employees and dispatch the excessive employees to other areas needing help. For example, in an effort to continually monitor employee productivity and help ensure efficient employee labor utilization, central computer 360 may continually monitor the number of goods and the number of customers arriving at POS station 350 and POS stations 348. In the event that there are relatively few customers checking out at POS station 350 and POS stations 348, central computer 360 may calculate that the average customer waiting time is sufficiently short based on the information transmitted from RFID tags attached to customer goods. Accordingly, central computer 360 may conclude that cashier employee 336 may be dispatched to another area that may have too few employees, such as shopping area "C" 324, to assist customers.

Different embodiments may dispatch employees to different areas of a business. For example, FIG. 3 shows that retail store 300 has storage area 303. Many businesses may have such a storage area or warehouse for temporarily storing goods 302. Also like many businesses, storage area 303 is equipped to receive goods from a cargo truck 310. As shown, storage area 303 has an RFID tag reader 306 that monitors the area immediately surrounding the outside doors of storage area 303 for the presence of goods that need to be unloaded. Whenever a cargo truck with goods, like cargo truck 310, backs up to the unloading dock RFID tag reader 306 may scan RFID tags attached to either pallets of the goods or the goods themselves. Upon scanning the RFID tags of the goods, RFID tag reader 306 may transmit the tag information to central computer 360. Upon receiving the tag information from RFID tag reader 306, central computer 360 may dispatch available employees to storage area 303 to assist in unloading the goods from cargo truck 310.

In alternative embodiments, central computer 360 may respond differently to the tag information transmitted from RFID tag reader 306. For example, RFID tag reader 306 may transmit information from RFID tags located in the badges of unloading employees 308. Such transmitted information may inform central computer 360 that some employees are already properly positioned in storage area 303 for unloading cargo truck 310. Consequently, central computer 360 may estimate the time required to unload the goods from cargo truck 310 based on the number of employees already available and the quantity of goods to be unloaded. If the estimated unloading time is unacceptably long, central computer 360 may dispatch idle employees to storage area 303 to assist in unloading. Conversely, if central computer 360 determines that the quantity of goods in cargo truck 310 is relatively small and the number of unloading employees 308 available is excessive, then central computer 360 may dispatch one or more of unloading employees 308 to an alternate location in the store needing additional employee labor.

Again, different embodiments may dispatch employees to different areas of a business depending on employee labor needs. As another example, FIG. 3 shows that retail store 300 has a customer service area 352 comprised of a customer service desk 338 and associated RFID tag reader 344. The RFID tag reader 344 may scan an area immediately surrounding customer service desk 338 for RFID tags embedded in goods, shopping baskets, customer reward cards, and employee badges. After reading information from RFID tags in the area, the RFID tag reader 344 may transmit the information to central computer 360. Depending on the information received from the RFID tag reader 344, central computer 360 may either dispatch employees to or from customer service desk 338.

An additional embodiment may be a tag reader reading information from a customer basket of consumer goods, analyzing the information from such goods, and matching the characteristics of the typical buyer of such a basket of goods to a consumer demographic that may be closely associated to an employee skill. One example may be goods typically bought by a specific cultural group, like Spanish speaking consumers, which may trigger the need for an employee with Spanish speaking skills over others without such skill.

As an example, there may only be one customer 342 and one customer service employee 340 at customer service desk 338. Accordingly, RFID tag reader 344 may transmit information from the badge of customer service employee 340 and a shopping basket tag for customer 342 to central computer 360. Pairing such information, central computer 360 may determine that customer service desk 338 is properly staffed. However, if more customers arrive at customer service area 352 and stand in line at customer service desk 338, the RFID tag reader 344 may detect and read the information from the additional RFID tags in shopping baskets, customer reward cards, and attached to goods. If central computer 360 determines a great disparity between the number of customers waiting at customer service area 352 and the number of employees working customer service desk 338, then central computer 360 may dispatch available employees at other locations within retail store 300 to customer service desk 338.

The aforementioned scenarios are illustrative examples of various embodiments and clearly demonstrate the innumerable ways in which RFID systems may be used to increase employee productivity and improve customer satisfaction in a wide range of business settings. However, due to the extreme flexibility of RFID systems and the great number of different employee work settings possible, describing all such variations in which RFID systems may be employed to improve employee productivity is impossible. Accordingly, one should keep in mind that these examples are merely illustrative and that embodiments which are similar to these described examples may well come within scope and spirit of this invention.

For example, while the particular embodiment depicted in FIG. 3 has four POS stations, other embodiments may have many more or even fewer POS stations. Similarly, other embodiments may not have any customer service centers or storage areas. Other embodiments may have loading and unloading docks for two or more cargo trucks. By way of contrast, in other embodiments the entire business involved may only be a single large warehouse or even a number of warehouses. Additionally, the business may not even be a store or warehouse, but any facility such as a cargo dock at an airport or a shipping dock located on a pier for transport ships.

Figure 4:
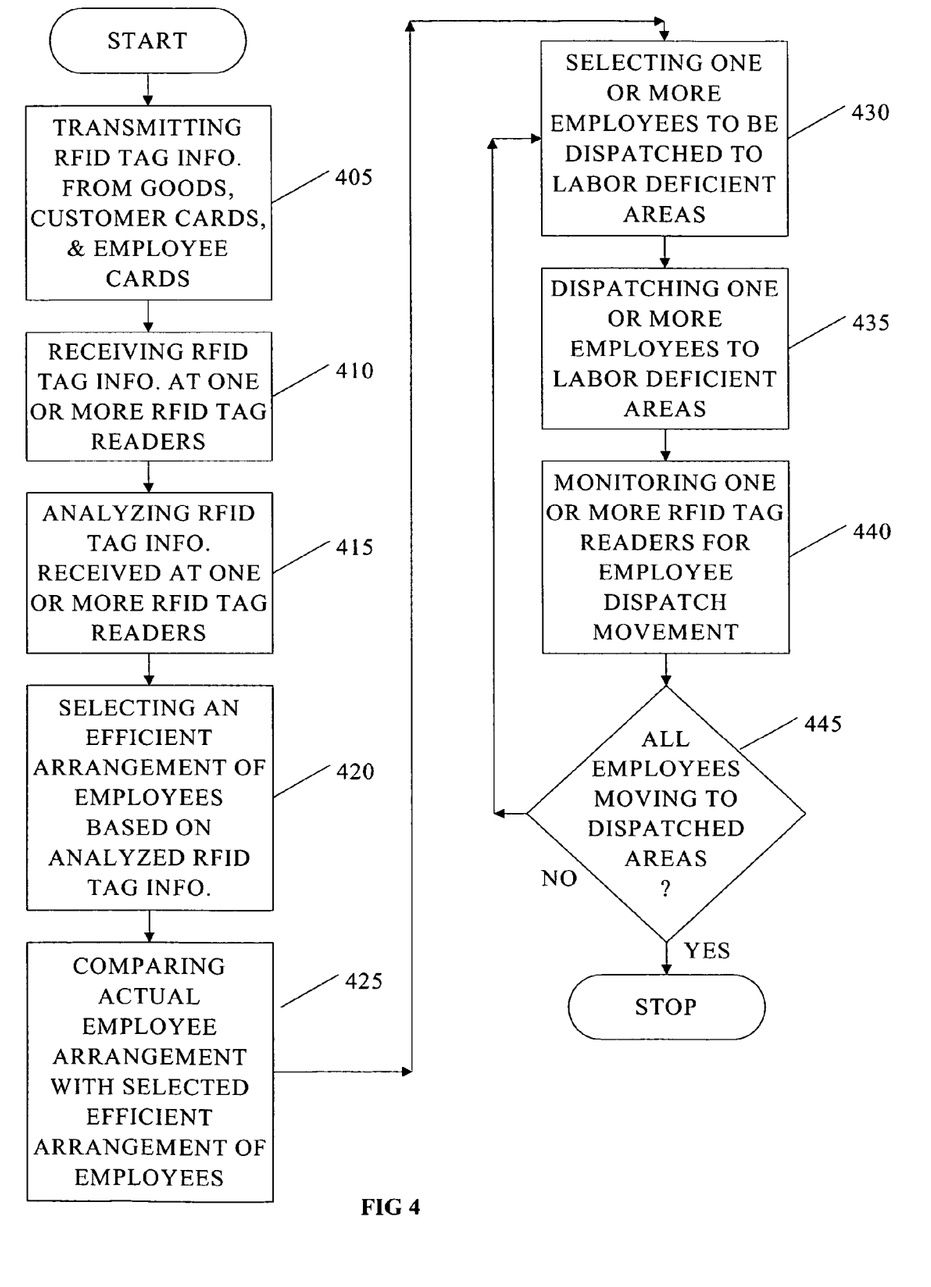
FIG. 4 depicts a flowchart describing an embodiment of method for improving employee productivity by monitoring RFID tags on goods, customers, and employees.

FIG. 4 depicts a flowchart 400 for a method of using RFID systems to improve employee productivity and reduce labor costs in businesses. Flowchart 400 begins with transmitting RFID tag information from RFID tags attached to consumer goods, and RFID tags embedded in customer cards and employee cards (element 405). Such transmission of tag information may be automatic, as may be the case with active RFID tags, or the transmission may be in response to an initial transmission from an RFID tag reader, which may be the case with passive RFID tags. The information transmitted from the RFID tags may simply be unique product identification numbers for goods to which the tags are attached. Additionally, the transmitted information may be the names of employees and customers.

After transmitting RFID tag information from various RFID tags, the transmitted tag information may be received at one or more RFID tag readers (element 410). The RFID tag readers may be integrated into POS stations or located adjacent to warehouse loading and unloading docks. Alternatively, the RFID tag readers may be located in a grid throughout a store, or located at any point in a business that may benefit from adding or removing employees based on dynamically changing workloads.

Once the RFID tag readers receive the tag information, the transmitted tag information may be relayed to computer, either a local computer or a remote computer. The computer may then take all the information received from the various RFID tag readers and store the information in either in memory or to a mass storage device. Once the information from the various RFID tag readers is stored, the computer may then analyze the data for opportunities to improve employee productivity (element 415) and choose a proper number and arrangement of employees to satisfy the employee productivity opportunity (element 420). An example may clarify the elements of analyzing the RFID data and selecting an efficient arrangement of employees.

Assume, for demonstration purposes, a retail store has ten POS stations that the store wants to efficiently staff, with the fewest number of cashiers possible, but without causing any customer to wait more that three minutes in line. Assume further that six of the POS stations are open, where POS cashiers are completing transactions with customers. The computer may sort through the stored data, which may comprise information transmitted from goods in shopping baskets of customers, from the six POS stations. The computer may detect that only six of the ten POS stations are in operation a variety of ways, such as recognizing the absence of tagged goods being scanned from RFID readers in the remaining four lines.

Based on the information scanned from the goods, the computer may dynamically determine that the average wait time for customers is considerably below the checkout time goal of three minutes. The computer may determine the average wait time falls well under three minutes by monitoring each of the customer transactions. Dynamically, the computer may calculate that the average customer purchases twelve items. The computer may also dynamically, in real-time, calculate that the average time for customers to complete each of the transactions averages forty-five seconds. The computer may calculate this average transaction time by measuring the amount of time that elapses from one sale to the next.

Continuing with our example, assume that the computer calculates that each open POS station has an average of 30 goods waiting to be purchased. With this information, the computer determines that average wait time for consumers is less than two minutes, well below the maximum goal of three minutes. The computer may then analyze the situation for an employee productivity improvement opportunity. The computer may try to determine if one or more of the lines can be closed down without exceeding the maximum three minute checkout time goal.

If the computer closes down only one of the six POS stations, the average number of items in each of the remaining five lines will increase to thirty-six. Consequently, the computer may determine that the average wait time for customers would be slightly over two minutes, but still less than three. Using this same methodology, the computer may continue and calculate the maximum number of POS stations that may be closed without exceeding the three minute goal. The computer may calculate that closing two of the six open lanes will result in an average checkout time slightly less than three minutes. However, the computer may calculate that closing three of the six POS stations would result in an average checkout time of almost four minutes. Based on this analysis, the computer may select an arrangement of four active POS station cashiers at the time of the calculation.

After analyzing the RFID tag information (element 415) and selecting an efficient arrangement of employees based on the information analysis (element 420), the computer may compare the selected efficient arrangement of employees with the actual arrangement of employees (element 425). In the previous example, the computer would determine that six of the POS stations are in operation, when only four of them need to be in operation. Because the calculated efficient number or arrangement of POS station cashiers is less than the actual number of employees serving as cashiers, the computer may then select one or more employees to be dispatched to other areas which would benefit from additional employee assistance (element 430).

Selecting which employees should be dispatched to other areas may be based on a variety of circumstances and different considerations. In some embodiments, the computer may track which employees have work restrictions that may impact the selection process. Some embodiments may also track employee task history for a particular workday. For example, assume that no employees are working in a store warehouse when a cargo truck arrives and needs to be unloaded. The computer may determine that a first employee currently working as a cashier may have a medical work restriction, such as a restriction to perform only light duty tasks. The computer may also determine that a second employee, also serving as a cashier, may have just completed two hours of working in the store warehouse, loading trucks. Accordingly, the computer may eliminate the first employee and the second employee from the list of potential employees that may be dispatched to the warehouse, based on these circumstances.

Once the computer determines which employees should be dispatched to other work areas (element 430), the computer may dispatch the employees to the designated work areas in a number of different ways (element 435). Continuing our example of reducing the current number of POS cashiers from six to four, the computer may send a message across the displays of two of the POS stations, ordering the employees shut down their stations and report to the warehouse. Alternatively, the computer may wirelessly transmit a message to a personal digital assistant (PDA), which the employee may be carrying, asking the employee to go to the warehouse.

After dispatching one or more employees to the labor deficient areas (element 435), the computer may monitor a grid of RFID tag readers and track the employee movement, via reading information from an RFID tag embedded in an employee security card, to ensure that the employee proceeds to the newly assigned work area (element 440). If one or more of the employees move toward the newly assigned work area, the computer may abandon that work assignment and select an alternate employee to dispatch to the labor deficient work area (elements 445 and 430).

Again, continuing our example of reducing the number of POS cashiers from six to four and dispatching two of the POS cashiers to the warehouse, assume that the two cashiers close their POS stations and proceed toward the warehouse. However, assume further that on the way to the warehouse, that a supervisor approaches one of the employees and instructs her to assist a customer. The computer may detect that only one of the employees dispatched to the warehouse actually arrived after a five minute period. The computer may also detect that the employee not arriving at the warehouse is proceeding in a direction away from the warehouse, based on information transmitted from the RFID tag embedded in the security card of the employee to the grid of RFID tag readers. Accordingly, the computer may select another employee and dispatch him or her to the warehouse.

Different embodiments using RFID systems to improve employee productivity may be configured in a variety of ways. Some RFID system embodiments may comprise RFID tags, RFID readers, an RFID central computer, and an RFID central computer software program accessing an RFID system software database. However, other embodiments may contain no software programs or software databases, relying exclusively on hardware to improve employee productivity using RFID systems in accordance with, e.g., flowchart 400 as shown in FIG. 4. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

One skilled in the art of radio frequency identification systems will readily appreciate the flexibility and opportunities that using RFID systems to improve employee productivity and decrease employee labor costs may present a business. The examples cited above are only a few of the potential cases wherein the use of RFID systems may increase employee productivity, improve customer satisfaction, and/or reduce overall employee labor costs.

It will be apparent to those skilled in the art having the benefit of this disclosure that the present invention contemplates methods, systems, and media to improve employee productivity by the use of RFID systems. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for dispatching, in real-time, employees of a business, the method comprising:

receiving, by a computer, information in at least one radio frequency identification (RFID) tag reader located in a work area, wherein receiving the information in at least one RFID tag reader comprises receiving the information in a plurality of RFID tag readers, the plurality of RFID tag readers arranged in a grid near a plurality of point of sale stations wherein the information is from a plurality of RFID tags that are affixed to a plurality of goods;

determining, by a computer, a calculated length of time needed to process the plurality of goods based on the information from the plurality of RFID tags that are affixed to the plurality of goods;

analyzing, by a computer, the information from the plurality of RFID tags to determine a required number of employees to work in the work area;

further determining, by a computer, the required number of employees to work in the work area based upon the calculated length of time needed to process the plurality of goods;

selecting, by a computer, the required number of employees to work in the work area based upon:

said analyzing, by a computer, the information from the plurality of RFID tags to determine the required number of employees to work in the work area, and said further determining, by a computer, the required number of employees to work in the work area based upon the calculated length of time needed to process the plurality of goods; and dispatching, by a computer, via a computer communicably coupled with the at least one RFID tag reader, a first employee to the work area according to the required number of employees selected to work in the work area.

2. The method of claim 1, further comprising dispatching a third employee from the work area based on the analyzing information, wherein the work area comprises a plurality of point of sale stations:

adjusting, by a computer, the calculated length of time according to a size and weight of a particular good from the plurality of goods, wherein data describing the size and weight of the particular good is stored in and transmitted from an RFID tag that is affixed to the particular good.

3. The method of claim 1, wherein the work area is a point of sale (POS) checkout area, wherein the calculated length of time is an estimated length of time that will be required to check out all customers currently in line at the POS checkout, and wherein the method further comprises:

calculating, by a computer, the estimated length of time based on the information from the plurality of RFID tags that are affixed to the plurality of goods.

4. The method of claim 1, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical average checkout time for the specific customer in line, and wherein the method further comprises:

adjusting, by a computer, the estimated length of time that will be required to check out all customers currently in line at the POS checkout based on the RFID tag reader receiving the historical average checkout time for the specific customer in line.

5. The method of claim 1, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical record of a preferred type of payment used by the specific customer in line, and wherein the method further comprises:

adjusting, by a computer, the estimated length of time that will be required to check out all customers currently in line at the POS checkout based on the RFID tag reader receiving the historical record of the preferred type of payment used by the specific customer in line.

6. The method of claim 1, wherein the work area is a warehouse equipped to receive goods from a cargo truck that contains the plurality of goods, and wherein the method further comprises:

calculating, by a computer, and dispatching to the warehouse, an estimated number of employees required to unload the cargo truck, wherein the estimated number of employees is based on the information from the plurality of RFID tags that are affixed to the plurality of goods.

7. The method of claim 1, wherein the plurality of RFID tags are affixed to goods in a customer basket in use by a particular customer, wherein the plurality of RFID tags describe the goods in the customer basket, and wherein the method further comprises:

matching, by a computer, characteristics of a predefined typical buyer of the goods in the customer basket to a consumer demographic;

matching, by a computer, the consumer demographic to a specific employee skill;

identifying, by a computer, a specific employee who holds the specific employee skill; and dispatching, by a computer, the specific employee to assist the particular customer.

8. A computer program product comprising:
a non-transitory computer readable storage media;
first program instructions to receive information from at least one radio frequency identification (RFID) tag reader located in a work area, wherein the information is sent to the RFID tag reader from a plurality of RFID tags that are affixed to a plurality of goods;

second program instructions to determine a calculated length of time needed to process the plurality of goods based on the information from the plurality of RFID tags that are affixed to the plurality of goods;

third program instructions to analyze the information from the plurality of RFID tags to determine a required number of employees to work in the work area;

fourth program instructions to further determine the required number of employees to work in the work area based upon the calculated length of time needed to process the plurality of goods;

fifth program instructions to select the number of required employees to work in the work area based upon execution of:

said third program instructions to analyze the information from the plurality of RFID tags to determine the required number of employees to work in the work area, and said fourth program instructions to further determine the required number of employees to work in the work area based upon the calculated length of time needed to process the plurality of goods; and sixth program instructions to dispatch, via a computer communicably coupled with the at least one RFID tag reader, the required number of employees selected to work in the work area;

and wherein the first, second, third, fourth, fifth, and sixth program instructions are stored on the non-transitory computer readable storage media.

9. The computer program product of claim 8, further comprising:

seventh program instructions to adjust the calculated length of time according to a size and weight of a particular good from the plurality of goods, wherein data describing the size and weight of the particular good is stored in and transmitted from an RFID tag that is affixed to the particular good; and wherein the seventh program instructions are stored on the non-transitory computer readable storage media.

10. The computer program product of claim 8, wherein the work area is a point of sale (POS) checkout area, wherein the calculated length of time is an estimated length of time that will be required to check out all customers currently in line at the POS checkout, and wherein the computer program product further comprises:

seventh program instructions to calculate the estimated length of time based on the information from the plurality of RFID tags that are affixed to the plurality of goods; and wherein the seventh program instructions are stored on the non-transitory computer readable storage media.

11. The computer program product of claim 8, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical average checkout time for the specific customer in line, and wherein the computer program product further comprises:

seventh program instructions to adjust the estimated length of time that will be required to check out all customers currently in line at the POS checkout based on the RFID tag reader receiving the historical average checkout time for the specific customer in line; and wherein the seventh program instructions are stored on the non-transitory computer readable storage media.

12. The computer program product of claim 8, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical record of a preferred type of payment used by the specific customer in line, and wherein the computer program product further comprises:
  seventh program instructions to adjust the estimated length of time that will be required to check out all customers currently in line at the POS checkout based on the RFID tag reader receiving the historical record of the preferred type of payment used by the specific customer in line; and wherein
the seventh program instructions are stored on the non-transitory computer readable storage media.

13. The computer program product of claim 8, wherein the work area is a warehouse equipped to receive goods from a cargo truck that contains the plurality of goods, and wherein the computer program product further comprises:
  seventh program instructions to calculate, and to dispatch to the warehouse, an estimated number of employees required to unload the cargo truck, wherein the estimated number of employees is based on the information from the plurality of RFID tags that are affixed to the plurality of goods; and wherein
the seventh program instructions are stored on the non-transitory computer readable storage media.

14. The computer program product of claim 8, wherein the plurality of RFID tags are affixed to goods in a customer basket in use by a particular customer, wherein the plurality of RFID tags describe the goods in the customer basket, and wherein the computer program product further comprises:
  seventh program instructions to match characteristics of a predefined typical buyer of the goods in the customer basket to a consumer demographic;
  eighth program instructions to match the consumer demographic to a specific employee skill;
  ninth program instructions to identify a specific employee who holds the specific employee skill; and
  tenth program instructions to dispatch the specific employee to assist the particular customer; and wherein
the seventh, eighth, ninth, and tenth program instructions are stored on the non-transitory computer readable storage media.

15. A computer system comprising:
  a processor, a computer readable memory, and a non-transitory computer readable storage media;
  first program instructions to receive information from at least one radio frequency identification (RFID) tag reader located in a work area, wherein the information is sent to the RFID tag reader from a plurality of RFID tags that are affixed to a plurality of goods;
  second program instructions to determine a calculated length of time needed to process the plurality of goods based on the information from the plurality of RFID tags that are affixed to the plurality of goods;
  third program instructions to analyze the information from the plurality of RFID tags to determine a required number of employees to work in the work area;
  fourth program instructions to further determine the required number of employees to work in the work area based upon the calculated length of time needed to process the plurality of goods;
  fifth program instructions to select the required number of employees to work in the work area based upon execution of:
    said third program instructions to analyze the information from the plurality of RFID tags to determine the required number of employees to work in the work area, and
    said fourth program instructions to further determine the required number of employees to work in the work area based upon the calculated length of time needed to process the plurality of goods; and
  sixth program instructions to dispatch the required number of employees to the work area; and wherein
the first, second, third, fourth, fifth, and sixth program instructions are stored on the non-transitory computer readable storage media for execution by the processor via the computer readable memory.

16. The computer system of claim 15, further comprising:
  seventh program instructions to adjust the calculated length of time according to a size and weight of a particular good from the plurality of goods, wherein data describing the size and weight of the particular good is stored in and transmitted from an RFID tag that is affixed to the particular good; and wherein
the seventh program instructions are stored on the non-transitory computer readable storage media for execution by the processor via the computer readable memory.

17. The computer system of claim 15, wherein the work area is a point of sale (POS) checkout area, wherein the calculated length of time is an estimated length of time that will be required to check out all customers currently in line at the POS checkout, and wherein the computer system further comprises:
  seventh program instructions to calculate estimated length of time based on the information from the plurality of RFID tags that are affixed to the plurality of goods; and wherein
the seventh program instructions are stored on the non-transitory computer readable storage media for execution by the processor via the computer readable memory.

18. The computer system of claim 15, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical average checkout time for the specific customer in line, and wherein the computer system further comprises:
  seventh program instructions to adjust the estimated length of time that will be required to check out all customers currently in line at the POS checkout based on the RFID tag reader receiving the historical average checkout time for the specific customer in line; and wherein
the seventh program instructions are stored on the non-transitory computer readable storage media for execution by the processor via the computer readable memory.

19. The computer system of claim 15, wherein the work area is a point of sale (POS) checkout area, wherein a specific customer in line at the POS checkout holds a customer identification card, wherein a customer RFID tag is attached to the customer identification card, wherein the customer RFID tag contains and transmits data describing a historical record of a preferred type of payment used by the specific customer in line, and wherein the computer system further comprises:
  seventh program instructions to adjust the estimated length of time that will be required to check out all customers currently in line at the POS checkout based on the RFID tag reader receiving the historical record of the preferred type of payment used by the specific customer in line; and wherein
the seventh program instructions are stored on the non-transitory computer readable storage media for execution by the processor via the computer readable memory.

20. The computer system of claim 15, wherein the plurality of RFID tags are affixed to goods in a customer basket in use by a particular customer, wherein the plurality of RFID tags describe the goods in the customer basket, and wherein the computer system further comprises:
- seventh program instructions to match characteristics of a predefined typical buyer of the goods in the customer basket to a consumer demographic;
- eighth program instructions to match the consumer demographic to a specific employee skill;
- ninth program instructions to identify a specific employee who holds the specific employee skill; and
- tenth program instructions to dispatch the specific employee to assist the particular customer; and wherein the seventh, eighth, ninth, and tenth program instructions are stored on the non-transitory computer readable storage media for execution by the processor via the computer readable memory.

* * * * *